US005466564A

United States Patent [19]

Blazey et al.

[11] Patent Number: 5,466,564
[45] Date of Patent: Nov. 14, 1995

[54] CONTROL OF NON-CONTACT INTERFERENCE FRINGES IN PHOTOGRAPHIC FILMS

[75] Inventors: Richard N. Blazey, Penfield; Andy H. Tsou, Pittsford, both of N.Y.

[73] Assignee: Eastman Kodak Company, Rochester, N.Y.

[21] Appl. No.: 351,995

[22] Filed: Dec. 8, 1994

[51] Int. Cl.[6] .............................. G03C 1/76; G03C 5/08; G03B 27/72; G03B 27/32

[52] U.S. Cl. .......................... 430/403; 430/494; 430/533; 430/950; 430/944; 355/71; 355/77; 359/240; 359/290; 359/489

[58] Field of Search .................................... 430/494, 533, 430/403, 950, 944; 359/240, 290, 489; 355/71, 77

[56] References Cited

U.S. PATENT DOCUMENTS

| | | | |
|---|---|---|---|
| 4,711,838 | 12/1987 | Grzeskowiak et al. | 430/950 |
| 4,762,384 | 8/1988 | Hegarty et al. | 350/403 |
| 5,225,319 | 7/1993 | Fukazawa | 430/533 |
| 5,385,704 | 1/1995 | Tsou et al. | 264/210.7 |

FOREIGN PATENT DOCUMENTS 60-200222 10/1985 Japan .

OTHER PUBLICATIONS

Serway, *Physics: For Scientists and Engineers,* Saunders College Publishing, Philadelphia, 1982, pp. 823–827.

Shurcliff and Ballard, *Polarized Light,* Van Nostrand, Princeton, N.J., pp. 42–49, 55 . 58.

Tsou et al., U.S. patent Ser. No. 08/098,488, filed Jul. 27, 1993 for Polyethylene Terephthalate Photographic Film Base.

*Primary Examiner*—Richard L. Schilling
*Attorney, Agent, or Firm*—William F. Noval

[57] ABSTRACT

A photographic optical system for substantially eliminating non-contact interference fringes in a photographic film comprises: (a) a source of polarized electromagnetic radiation, the radiation being characterized by a wavelength and an incident polarization angle; and (b) a photographic film capable of optical communication with the source and serving to transmit or reflect a portion of the radiation, the film comprising a silver halide emulsion layer on a birefringent support, the support being characterized by a thickness, an emulsion layer interface, an air interface, and birefringence that is dependent on the wavelength of the radiation; wherein the radiation wavelength and incident polarization angle and the support thickness and birefringence are selected such that radiation which penetrates the film and reflects from the air interface exits the support at the emulsion layer interface polarized at an angle substantially perpendicular to the incident polarization angle; whereby the photographic film may be imaged by the source of polarized electromagnetic radiation substantially without formation of non-contact interference fringes. In a process for eliminating non-contact interference fringes, a film that includes a support having a selected thickness and birefringence is exposed by polarized light characterized by a wavelength and an incident polarization angle. Photographic development processing of the exposed film produces an image substantially without fringes.

14 Claims, 1 Drawing Sheet

CONTROL OF NON-CONTACT INTERFERENCE FRINGES IN PHOTOGRAPHIC FILMS

FIELD OF THE INVENTION

This invention relates to control of non-contact interference fringes, and particularly to a photographic optical system comprising a source of polarizing exposing radiation and a photographic film that can be imaged without formation of interference fringes.

BACKGROUND OF THE INVENTION

Non-contact interference fringes are produced when light reflecting from the back surface and other interfaces in a film structure produces artifacts in a silver halide emulsion layer of the film. If the emulsion layer is sufficiently turbid, light scattering can reduce these artifacts to the point of undetectability. However in films where the silver halide grain size is small and the exposing radiation is coherent as in, for example, image producing systems such as laser printers, non-contact interference fringes can seriously degrade the quality of the image not only from an aesthetic standpoint but also in a substantial loss of information cased by density distortions associated with the fringes.

To diminish the non-contact interference fringes in a photographic film, one may increase the turbidity of the emulsion layer by coating the silver halide at a higher concentration. However the increased silver level adds to the cost of the film and largely negates the advantage of using a fine grain emulsion.

Grzeskowiak et al., U.S. Pat. No. 4,711,838, the disclosures of which are incorporated herein by reference, describes several approaches purported to prevent the formation of non-contact interference fringes. For example, the photographic element may include a diffuse transmitting topcoat layer and/or a diffuse reflecting or absorbing backing layer. The diffusive properties of these topcoat and backing layers may be achieved by microscopic roughening of their surfaces or by including in them a binder and particles having a high refractive index, for example, desensitized silver halide. Alternatively, the photographic element may include a backing or subbing layer containing a dye that absorbs in the wavelength range of the exposing source.

PROBLEM TO BE SOLVED BY THE INVENTION

Additional silver halide as well as the various approaches to eliminate non-contact interference fringes proposed in Grzeskowiak et al., which suggests their use in combination, require additional coating components and manufacturing steps, which can add substantially to the production costs of the film. The need remains for an economical solution to the elimination of non-contact interference fringes, particularly in fine grain films intended for exposure in image producing apparatus such as laser printers. The present invention meets this need.

SUMMARY OF THE INVENTION

According to one aspect of the invention, a photographic optical system for substantially eliminating non-contact interference fringes in a photographic film comprises:

(a) a source of polarized electromagnetic radiation, the radiation being characterized by a wavelength and an incident polarization angle; and (b) a photographic film capable of optical communication with the source and serving to transmit or reflect a portion of the radiation, the film comprising a silver halide emulsion layer on a birefringent support, the support being characterized by a thickness, an emulsion layer interface, an air interface, and birefringence that is dependent on the wavelength of the radiation;

wherein the radiation wavelength and incident polarization angle and the support thickness and birefringence are selected such that radiation which penetrates the film and reflects from the air interface exits the support at the emulsion layer interface polarized at an angle substantially perpendicular to the incident polarization angle;

whereby the photographic film may be imaged by the source of polarized electromagnetic radiation substantially without formation of non-contact interference fringes.

In another aspect of the invention, a photographic film useful for imaging by exposing with polarized electromagnetic radiation characterized by a wavelength and an incident polarization angle serves to transmit or reflect a portion of the exposing radiation and comprises: a silver halide emulsion layer on a birefringent support, the support being characterized by a thickness, an emulsion layer interface, an air interface, and birefringence that is dependent on the wavelength of the exposing radiation; wherein the support thickness and birefringence are selected such that exposing radiation which penetrates the film and reflects from the air interface exits the support at the emulsion layer interface polarized at an angle substantially perpendicular to the incident polarization angle; whereby the photographic film may be imaged by polarized electromagnetic radiation substantially without formation of non-contact interference fringes.

In a further aspect of the invention, a process for substantially eliminating non-contact interference fringes in an imaged photographic film comprises:

(a) providing a photographic film useful for imaging by exposing with polarized electromagnetic radiation characterized by a wavelength and an incident polarization angle, the film serving to transmit or reflect a portion of the exposing radiation and comprising a silver halide emulsion layer on a birefringent support, the support being characterized by a thickness, an emulsion layer interface, an air interface, and birefringence that is dependent on the wavelength of the exposing radiation; wherein the support thickness and birefringence are selected such that exposing radiation which penetrates the film and reflects from the air interface exits the support at the emulsion layer interface polarized at an angle substantially perpendicular to the incident angle;

(b) exposing the photographic film to polarized electromagnetic radiation; and (c) subjecting the exposed film to photographic development processing, thereby producing an image substantially without non-contact interference fringes.

ADVANTAGEOUS EFFECT OF THE INVENTION

The photographic optical system of the present invention obviates the need for additional components or coating steps in the film manufacturing operation to control non-contact interference fringes. Neither extra layers nor light absorbing dyes nor higher silver concentrations are required. Only a few parameters employed in the manufacture of the support, along with the incident polarization angle and wavelength of the radiation, need be adjusted. Thus, the invention provides a convenient, low cost solution to the non-contact interference fringe problem. Further, laser printers already in the field can be modified by adjusting the radiation plane of polarization to expose new films coated on supports that function as half-wave plates.

DETAILED DESCRIPTION OF THE INVENTION

Figure 1:
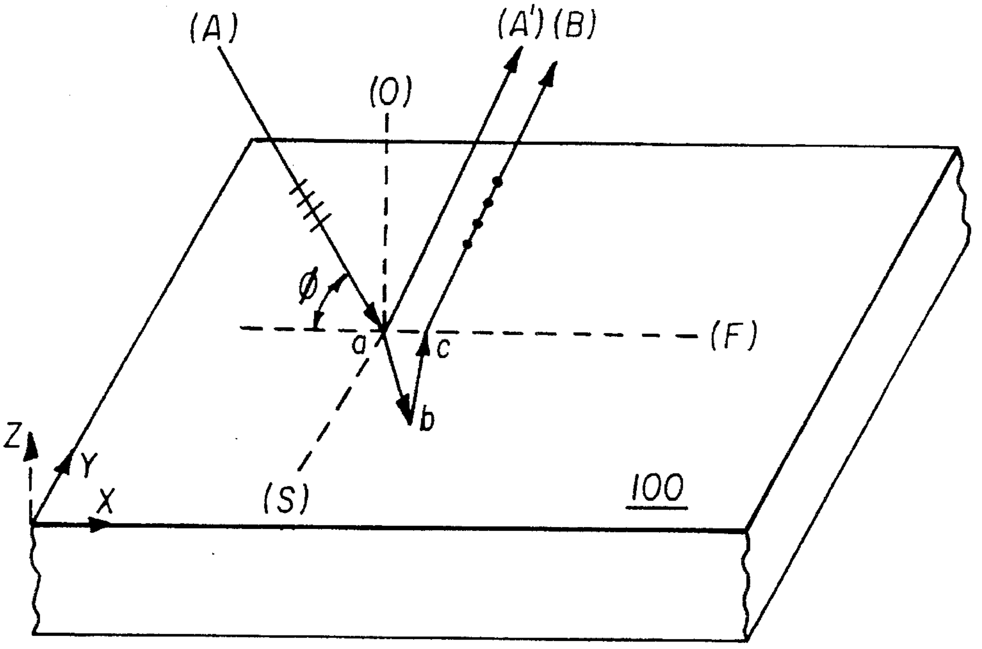
FIG. 1 is an elevation view of a birefringent film with polarized incident and refracted rays.

Interference patterns are produced when radiation waves that are reflected or refracted by an object are superimposed on the incident radiation waves. In a photographic film comprising a silver halide emulsion layer on a support, non-contact fringes arising from interference of the exposing radiation by radiation reflected from the support, particularly from the support-air interface on the side opposite the emulsion, can degrade the quality of the photographic image. If there is sufficient light scattering within the emulsion layer, these fringes can be dispersed even to the point of invisibility. However photographic materials often contain very fine silver halide emulsion grains with average diameters no greater than about 0.4 μm, even 0.2 μm or less, that produce low light scatter, thereby aggravating the fringing problem.

In addition to emulsion grain size, other factors that affect fringing must be considered. For example, apparatus employed to expose these fine grain films frequently utilize light sources having narrow linewidths, such as those produced by a diode laser. Radiation characterized by narrow linewidth increases the severity of fringing. Shifting the wavelength of the exposing source from the visible to the infrared region further contributes to the non-contact interference fringe problem, a serious concern given the widespread use of infrared emitting lasers in printing apparatus.

If the photographic film comprises a transparent support with birefringent characteristics, these characteristics can be selected, depending on the wavelength and polarization angle, preferably 45°, of the exposing source of polarized radiation, thus reducing or eliminating interference fringes and thereby maintaining the quality of the photographic image.

In accordance with the present invention, a photographic optical system comprises a source of polarized electromagnetic radiation, preferably a diode laser that emits in the infrared region, and a photographic film comprising a fine-grain silver halide emulsion layer and a birefringent support. The silver halide emulsion layer comprises silver halide grains characterized by an average diameter no greater than about 0.4 μm, preferably no greater than about 0.2 μm, and the birefringent support preferably comprises a polyester layer having a thickness of about 12 to 300 μm and birefringence in the range of about 0.001 to 0.2. Exposure of the photographic film to polarized radiation, followed by photographic development processing, produces an image substantially without non-contact interference fringes.

As described in Serway, *Physics: For Scientists and Engineers*, Saunders College Publishing, Philadelphia, 1982, pages 823–827, the disclosures of which are incorporated herein by reference, a wave of electromagnetic radiation is characterized by an electric vector and a magnetic vector, which are at right angles to each other and also to the direction of wave propagation. If, in a beam of light produced by atomic vibration from a light source, the vibrations within a plane perpendicular to the direction of wave propagation vibrate in every direction with equal probability, the light is said to be unpolarized. On the other hand, if in a particular plane the vibrations occur in only one direction, the light is said to be linearly polarized.

If the direction of light wave propagation is along the z axis and an electric vector E at a particular point is at an angle θ with the x axis, the vector consists of two components, $E_x=E\cos\theta$ and $E_y=E\sin\theta$. For linearly polarized light one of these components is always zero or θ is invariant with time. If at some point $E_x$ and $E_y$ are of equal magnitude but differ in phase by 90°, the wave is said to be circularly polarized at that point. However if $E_x$ and $E_y$ are of unequal magnitude and the phase difference is 90°, the wave is elliptically polarized. For unpolarized light, $E_x$ and $E_y$ are on average equal and the phase difference between them varies randomly.

In an isotropic medium, light travels with a speed that is the same in all directions; hence the medium is characterized by a single index of refraction. In a double refracting or birefringent material, however, the speed of light is not the same in all directions, and the index of refraction varies with the direction of travel of the light. Birefringence, generally represented by J, is defined as the difference between the refractive index measured along the fast axis and the refractive index measured along the slow axis. Refractive indices can be measured using the procedure described in *Encyclopedia of Polymer Science and Engineering*, Wiley, New York, 1988, page 261, the disclosures of which are incorporated herein by reference.

Examples of birefringent media include inorganic crystals, quartz and calcite for example, as well as organic materials such as certain polymers. For example, an extruded film of an aromatic polyester such as polyethylene terephthalate may be subjected to bilateral stretching in both the longitudinal (machine) direction and the transverse (cross-machine) direction. By apparatus and methods well known in the art, a polyester film may be stretched to about 2–4 times its original dimensions. Such apparatus and methods are described in U.S. Pat. No. 3,903,234, the disclosures of which are incorporated herein by reference.

Polyethylene terephthalate photographic film supports that may function as half-wave plates in accordance with the present invention can be formed and their birefringence measured by procedures described in Tsou et al., U.S. patent application Ser. No. 08/098,488, POLYETHYLENE TEREPHTHALATE PHOTOGRAPHIC FILM BASE, filed Jul. 27, 1993, the disclosures of which are incorporated herein by reference. Birefringence values of the film support may range from about 0.001 to 0.2, preferably about 0.005 to 0.05. The support thickness may be about 12 to 300 μm (0.5 to 12 mil), preferably about 100 to 250 μm (4 to 10 mil), more preferably about 150 to 200 μm (6 to 8 mil).

Following stretching, a polyester film is annealed to stabilize its structure. This process of stretching and annealing hardens the film and improves its optical clarity and thickness uniformity. Thus, for example polyethylene terephthalate resin may be fed into an extruder, heated above its melting point, and cast through a die onto a quench wheel. The cooled film is passed through rollers in a drafting section to heat and stretch it in a machine direction to a ratio of 2.0 to 4.0. After cooling, the film is passed into a tentering section where it is heated and stretched in a transverse direction to a ratio of 2.0 to 4.0. Following tentering, the film is heat set under constant constraint at an elevated temperature. Following this annealing process, the film may be detentered or shrunk in the transverse direction by some desired amount by continued heating at elevated temperature but with relaxation of the constraint.

The stretching and annealing process produces a biaxially oriented film with birefringent characteristics, which causes a ray of light to travel at different velocities through the film, depending on its direction of travel. The direction in which the ray travels fastest is the fast axis (F), which approximately corresponds to the longitudinal (machine) direction of the film. The ray travels slowest in the direction of the slow axis (S), which is orthogonal to the fast axis and corresponds generally to the transverse (cross-machine) direction of the film.

Referring to FIG. 1, if a ray of light (A) having a particular wavelength and linearly polarized in the plane of incidence (the x-z plane defined by the ray (A) and the surface normal) enters a birefringent film 100, it is divided into two components. If the two component rays have the same velocity, they are by definition traveling in the direction of the optic axis (O). Typically, however, the components have differing velocities, the slower traveling in the direction of the slow axis, the faster in the direction of the fast axis. All three axes—optic, slow and fast—are orthogonal to one another. This behavior of polarized radiation in a birefringent medium is described in W. A. Shurcliff and S. S. Ballard, *Polarized Light*, Van Nostrand, Princeton N.J., pages 42–49, the disclosures of which are incorporated herein by reference.

In the birefringent film, the phase of one of the component rays is shifted relative to that of the other before they are recombined. The resultant ray is thus differently polarized from the incident ray. If, when the component rays exit the film, the slow ray emerges exactly one-half wavelength behind, i.e., 180° out of phase with, the fast ray, the combined exit ray (B) is polarized in the direction opposite that of the incident ray (A). Thus, if ray (A) has a polarization angle $\alpha$, that of ray (B) will be $-\alpha$. In this case, the birefringent film serves as a half-wave plate, or 180° retarder, as discussed in Shurcliff et al., *Polarized Light, pages* 55–58, the disclosures of which are incorporated herein by reference. The ability of a birefringent polymeric film to function as a half-wave plate depends on its thickness as well as its birefringent characteristics, which, as previously discussed, are determined by the conditions, particularly stretching, employed in its formation.

If a linearly polarized light ray (A) having a particular wavelength penetrates the upper surface of a birefringent film at point a, reflects off the lower surface at point b, and re-emerges from the film at point c as ray (B), and if the pathlength a-b-c of the ray through the film, which is approximately equal to double the film thickness, equals one-half wavelength, or an odd multiple (1,3,5, etc.) thereof, referred to as the number order (m), the film functions as a half-wave plate and the polarization angle of ray (B) is opposite to that of ray (A). The thickness and birefringent properties of the film can be controlled during its manufacture to enable it to perform as a half-wave plate for light of a given wavelength. In addition to the thickness and birefringence, the orientation of the fast and slow axes relative to the machine and transverse directions can be controlled during the support manufacturing process to allow a fixed orientation of the laser radiation source in the exposing apparatus.

A linearly polarized ray (A) of a given wavelength entering a half-wave plate as just described, i.e., where the a-b-c pathlength equals one-half wavelength or an odd multiple thereof, forms an incident polarization angle $\phi$ with the fast axis (F), as measured in the x-y plane defined by the ray and the fast axis. When $\phi$ is equal to 45°, the polarization angle of the reflected ray (B) is perpendicular to the plane of incidence of ray (A) and thus incapable of interfering with either (A) or the ray (A') that is reflected from the front surface of the film. Although the interference of incident and refracted rays may be mitigated if the angle $\phi$ varies from 45°, it is at a value of 45° for $\phi$ that interference is minimized.

Figure 2:
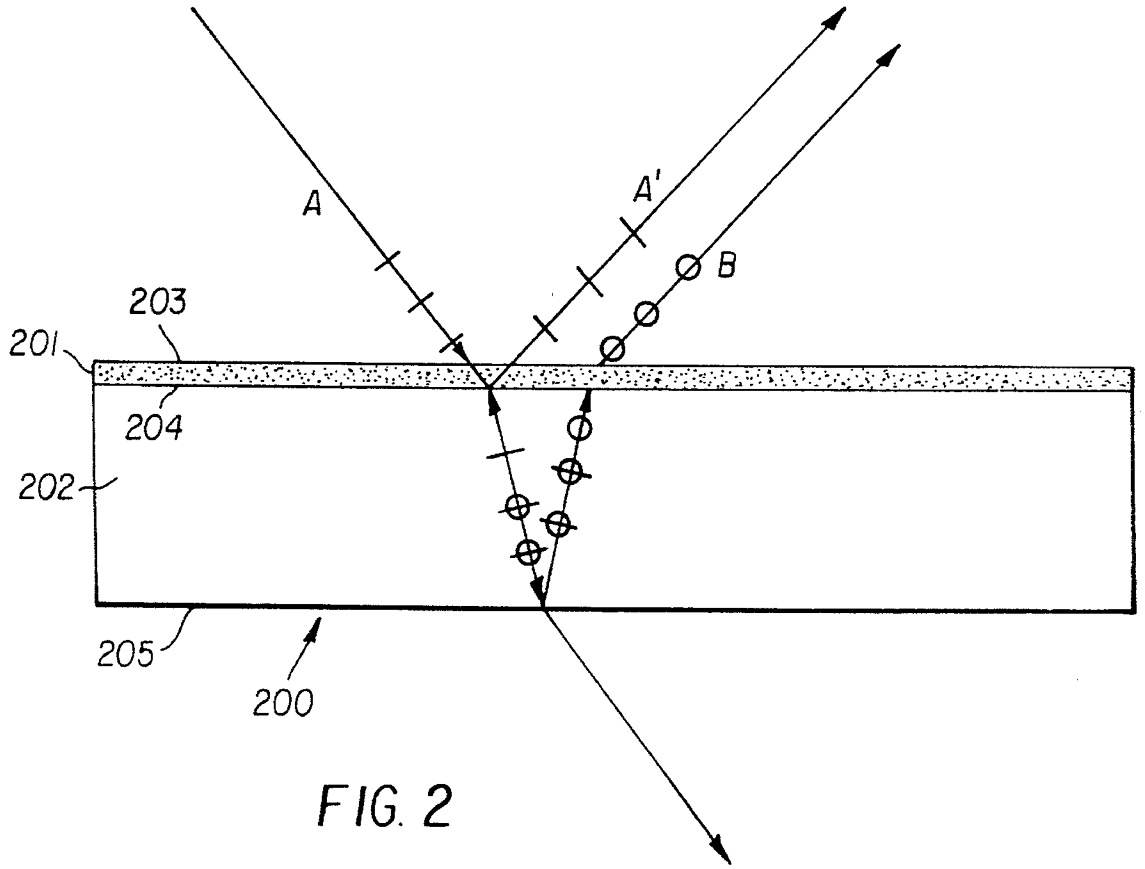
FIG. 2 is a schematic section view depicting polarized radiation beams incident on and reflected from a photographic film comprising a photographic emulsion layer and a birefringent support.

FIG. 2 depicts an incident ray (A) of light, linearly polarized in the plane of incidence defined by the incident beam and the surface normal, striking the photographic film 200, which comprises a silver halide emulsion layer 201 on a birefringent polyester support 202, at the air-emulsion layer interface 203 and penetrating the emulsion layer to the emulsion layer-support interface 204. A portion of the radiation, ray (A'), is reflected from both interfaces 203 and 204 (because the emulsion layer is thin relative to the thickness of the support, the radiation reflected from both interfaces may be considered as a single beam reflected from interface 204). A portion of the radiation, ray (B), penetrates the support and is reflected from the air-support interface 205 back through the support and the emulsion layer. If the support is birefringent, and if the support thickness is such that a total phase change of one half wavelength occurs between the point where the ray enters the support and returns to the emulsion layer, and if further the fast axis (F) of the waveplate comprising the birefringent support forms an angle of 45° with ray (A), then the ray (B) reflected from interface 205 will be linearly polarized perpendicular to the plane of incidence and will not be capable of interfering with the either the incident ray (A) or the ray (A') that is reflected from interface 204. Rays (A) and (A') will still be able to interfere, but because of a reasonably good refractive index match between the emulsion layer and support at interface 204, reflection ray (A') will be weak and so will its interference with incident ray (A).

Similarly, if the incident light ray (A) were right hand circularly polarized and the reflected ray (B) were left hand circularly polarized and 180° out of phase with the incident ray, interference between the incident and reflected rays would be substantially eliminated.

The following example further illustrates the invention:

As previously discussed, the ability of a birefringent film to operate as a half-wave plate for light of a particular wavelength depends on its birefringence and its thickness; the pathlength of the light through the film support is taken to be twice its thickness (t); i.e., 2t.

In accordance with the present invention, the retardance (R) of a birefringent film support is defined by the following relationship:

$$R = \frac{2tJ}{m\lambda}$$

where t is the film support thickness, J is the film support birefringence, m is the number order as previously defined, and λ0 is the wavelength of the exposing radiation. Various combinations of film support birefringence and thickness can be selected to provide a value of R equal to 0.5, which defines a half-wave plate. Thus, for example, birefringent films of thickness 4-mil (102 μm) 7-mil (178 μm), and 10-mil (254 μm) and having the birefringence values (shown with the corresponding number orders) given in the following table can serve as half-wave plates for exposing radiation of 670 nm (0.67 μm).

| Number | Film Thickness (t) | | |
|---|---|---|---|
| Order (m) | 4-mil (102 μm) | 7-mil (178 μm) | 10-mil (258 μm) |
| 1 | .00164 | .00094 | |
| 3 | .00495 | .00283 | .00195 |
| 5 | .00824 | .00471 | .00325 |
| 7 | .01154 | .00659 | .00454 |
| 9 | .01484 | .00848 | .00584 |
| 11 | .01813 | .01036 | .00714 |
| 13 | .02143 | .01225 | .00844 |
| 15 | .02473 | .01413 | .00974 |
| 17 | .02803 | .01602 | .01104 |
| 19 | .03132 | .01790 | .01233 |
| 25 | .04105 | .02353 | .01623 |
| 29 | .04762 | .02729 | .01883 |
| 35 | .05747 | .03294 | .02272 |
| 39 | | .03670 | .02532 |
| 49 | | .04611 | .03181 |
| 59 | | .05552 | .03830 |
| 69 | | | .04479 |
| 79 | | | .05129 |

Although the thickness and birefringence of values shown above represent optimum combinations of characteristics for the functioning of films as half-wave plates for radiation of 670 nm wavelength, other combinations that produce retardance values closely approximating 0.5 may produce substantial reduction of the interference between incident and refracted rays. Thus, for example, for a polyethylene terephthalate film having a thickness of 7.85 mils (174 μm) and a birefringence of 0.0178, the retardance (R) for a number order of 19 and exposing radiation of 670 nm can be calculated as follows:

$$R = \frac{2(174)(.0178)}{19(.67)} = 0.487$$

A birefringent film with a retardance of 0.487 would, when used as a photographic support, substantially counter the formation of non-contact interference fringes that degrade a photographic image. The scattering produced by an emulsion layer containing small silver halide grains may be enough to eliminate the fringes completely.

Although the computations described in the foregoing discussion were carried out for a specific exposing radiation wavelength and three selected thicknesses, it is recognized that the present invention may be beneficially applied to photographic systems employing various sources of exposing radiation and to photographic films whose birefringent supports have thicknesses other than the aforementioned exemplary values.

The invention has been described with particular reference to preferred embodiments thereof, but it will be understood that variations and modifications can be effected by a person of ordinary skill in the art within the spirit and scope of the invention.

What is claimed is:

1. A photographic optical system for substantially eliminating non-contact interference fringes in a photographic film, which comprises:

(a) a source of polarized electromagnetic radiation, said radiation being characterized by a wavelength and an incident polarization angle; and (b) a photographic film capable of optical communication with said source and serving to transmit or reflect a portion of said radiation, said film comprising a silver halide emulsion layer on a birefringent support, said support being characterized by a thickness, an emulsion layer interface, an air interface, and birefringence that is dependent on the wavelength of said radiation;

wherein said radiation wavelength and incident polarization angle and said support thickness and birefringence are selected such that radiation which penetrates said film and reflects from said air interface exits said support at said emulsion layer interface polarized at an angle substantially perpendicular to said incident polarization angle;

whereby the photographic film may be imaged by said source of polarized electromagnetic radiation substantially without formation of non-contact interference fringes.

2. A photographic optical system of claim 1 wherein said source of radiation is a diode laser.

3. A photographic optical system of claim 1 wherein said wavelength is included in the infrared region of the spectrum.

4. A photographic optical system of claim 1 wherein said emulsion layer comprises silver halide grains characterized by an average diameter no greater than about 0.4 μm.

5. A photographic optical system of claim 4 wherein said average diameter is no greater than about 0.2 μm.

6. A photographic optical system of claim 1 wherein said birefringent support comprises a polyester.

7. A photographic optical system of claim 6 wherein said support has a birefringence of about 0.001 to 0.2.

8. A photographic optical system of claim 7 wherein said birefringence is about 0.005 to 0.05.

9. A photographic optical system of claim 6 wherein said support has a thickness of about 12 to 300 μm.

10. A photographic optical system of claim 9 wherein said thickness is about 150 to 200 μm.

11. A process for substantially eliminating non-contact interference fringes in an imaged photographic film, which comprises:

(a) providing a photographic film useful for imaging by exposing with polarized electromagnetic radiation characterized by a wavelength and an incident polarization angle, said film serving to transmit or reflect a portion of said exposing radiation and comprising a silver halide emulsion layer on a birefringent support, said support being characterized by a thickness, an emulsion layer interface, an air interface, and birefringence that is dependent on the wavelength of said exposing radiation; wherein said support thickness and birefringence are selected such that exposing radiation which penetrates said film and reflects from said air interface exits said support at said emulsion layer interface polarized at an angle substantially perpendicular to said incident polarization angle;

(b) exposing said photographic film to said polarized electromagnetic radiation; and (c) subjecting the exposed film to photographic development processing, thereby producing an image substantially without non-contact interference fringes.

12. A process of claim 11 wherein said wavelength is included in the infrared region of the spectrum.

13. A process of claim 11 wherein said emulsion layer comprises silver halide grains characterized by an average diameter no greater than about 0.2 μm.

14. A process of claim 11 wherein said birefringent support comprises a polyester and has a birefringence of about 0.001 to 0.2 and a thickness of about 12 to 300 l μm.

* * * * *